(12) United States Patent
Lin et al.

(10) Patent No.: US 6,873,786 B2
(45) Date of Patent: Mar. 29, 2005

(54) REVERSE TRICK MODES ON NON-PROGRESSIVE VIDEO USING SPECIAL GROUPS OF PICTURES

(75) Inventors: Shu Lin, Indianapolis, IN (US); Donald Henry Willis, Indianapolis, IN (US)

(73) Assignee: THOMSON Licensing S.A., Boulogne-Billancourt (FR)

( * ) Notice: Subject to any disclaimer, the term of this patent is extended or adjusted under 35 U.S.C. 154(b) by 84 days.

(21) Appl. No.: 10/429,814

(22) Filed: May 5, 2003

(65) Prior Publication Data

US 2004/0223723 A1 Nov. 11, 2004

(51) Int. Cl.[7] .................................................. H04N 5/91
(52) U.S. Cl. ........................ 386/68; 386/70; 386/110; 386/109
(58) Field of Search ............................. 386/46, 68, 69, 386/70, 109, 110, 111, 112, 131; H04N 5/91

(56) References Cited

U.S. PATENT DOCUMENTS

| | | | | |
|---|---|---|---|---|
| 5,652,823 A | * | 7/1997 | Eto | 386/68 |
| 5,675,693 A | * | 10/1997 | Kagoshima | 386/70 |
| 5,694,172 A | * | 12/1997 | Miyano | 375/240.13 |
| 5,699,474 A | * | 12/1997 | Suzuki et al. | 386/112 |
| 5,701,386 A | * | 12/1997 | Yoneyama | 386/109 |
| 6,064,794 A | * | 5/2000 | McLaren et al. | 386/111 |
| 6,141,491 A | * | 10/2000 | Yamagishi et al. | 386/112 |
| 6,356,702 B1 | * | 3/2002 | Suzuki | 386/81 |
| 6,549,578 B1 | * | 4/2003 | Maruya et al. | 375/240.23 |
| 6,751,400 B1 | * | 6/2004 | Matsumura et al. | 386/68 |
| 2002/0044761 A1 | * | 4/2002 | Takashima et al. | 386/68 |
| 2002/0061184 A1 | * | 5/2002 | Miyamoto | 386/68 |
| 2003/0012561 A1 | * | 1/2003 | Willis | 386/111 |

* cited by examiner

Primary Examiner—Vincent Boccio
(74) Attorney, Agent, or Firm—Joseph S. Tripoli; Harvey D. Fried; Christine Johnson

(57) ABSTRACT

The invention concerns a method (200) and system (100) for performing a reverse trick mode. The method includes the steps of receiving (212) a non-progressive video signal and encoding (214) the non-progressive video signal into at least one group of pictures having at least one prediction source picture and at least one non-prediction source picture. All the non-prediction source pictures are predicted from the at least one prediction source picture such that no non-prediction source picture is predicted from another non-prediction source picture. The method also includes the step of, in response to a reverse trick mode command, altering (220) the display order of the group of pictures to permit the group of pictures to be displayed in a reverse order.

36 Claims, 18 Drawing Sheets

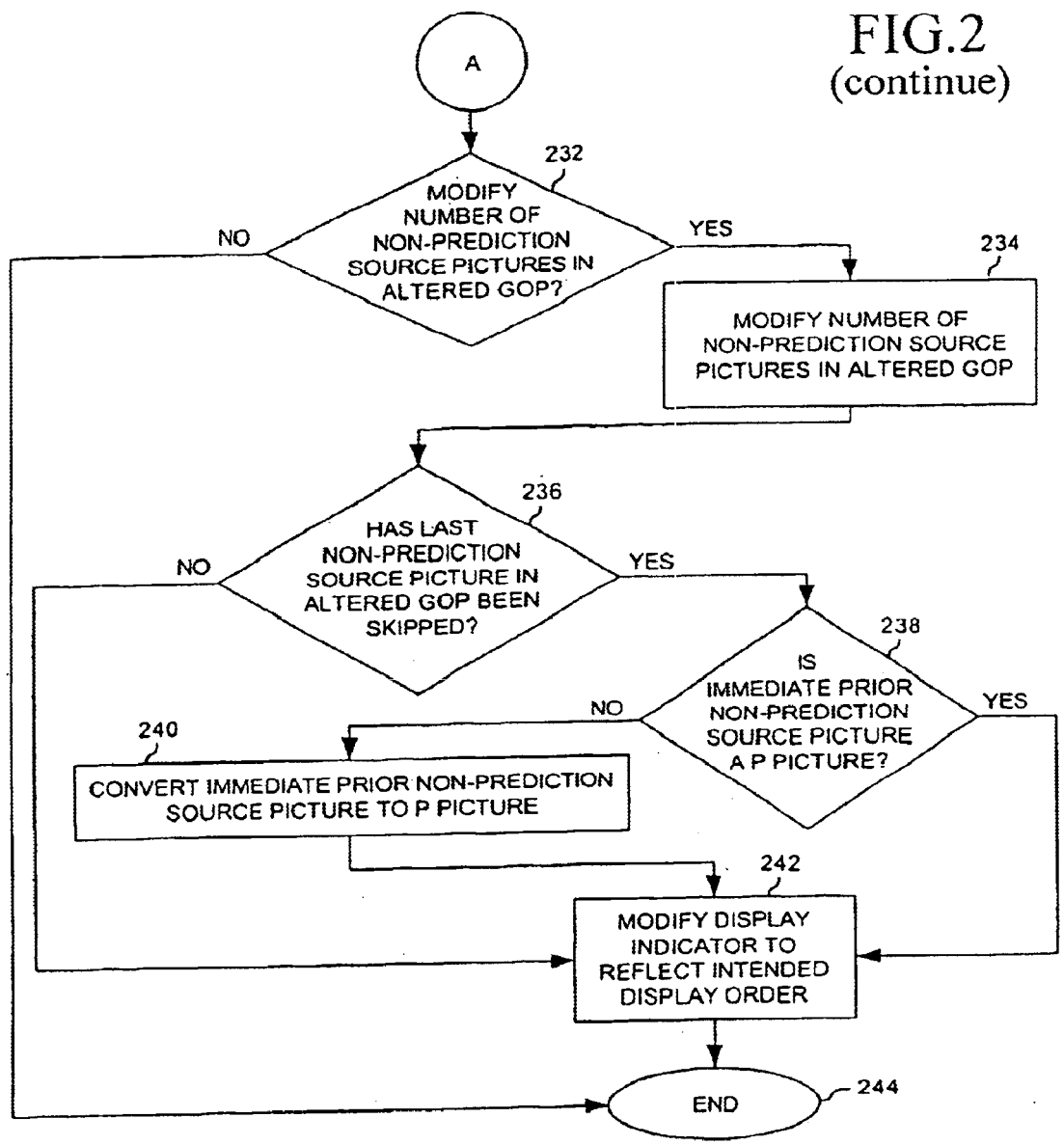
FIG.2 (continue)

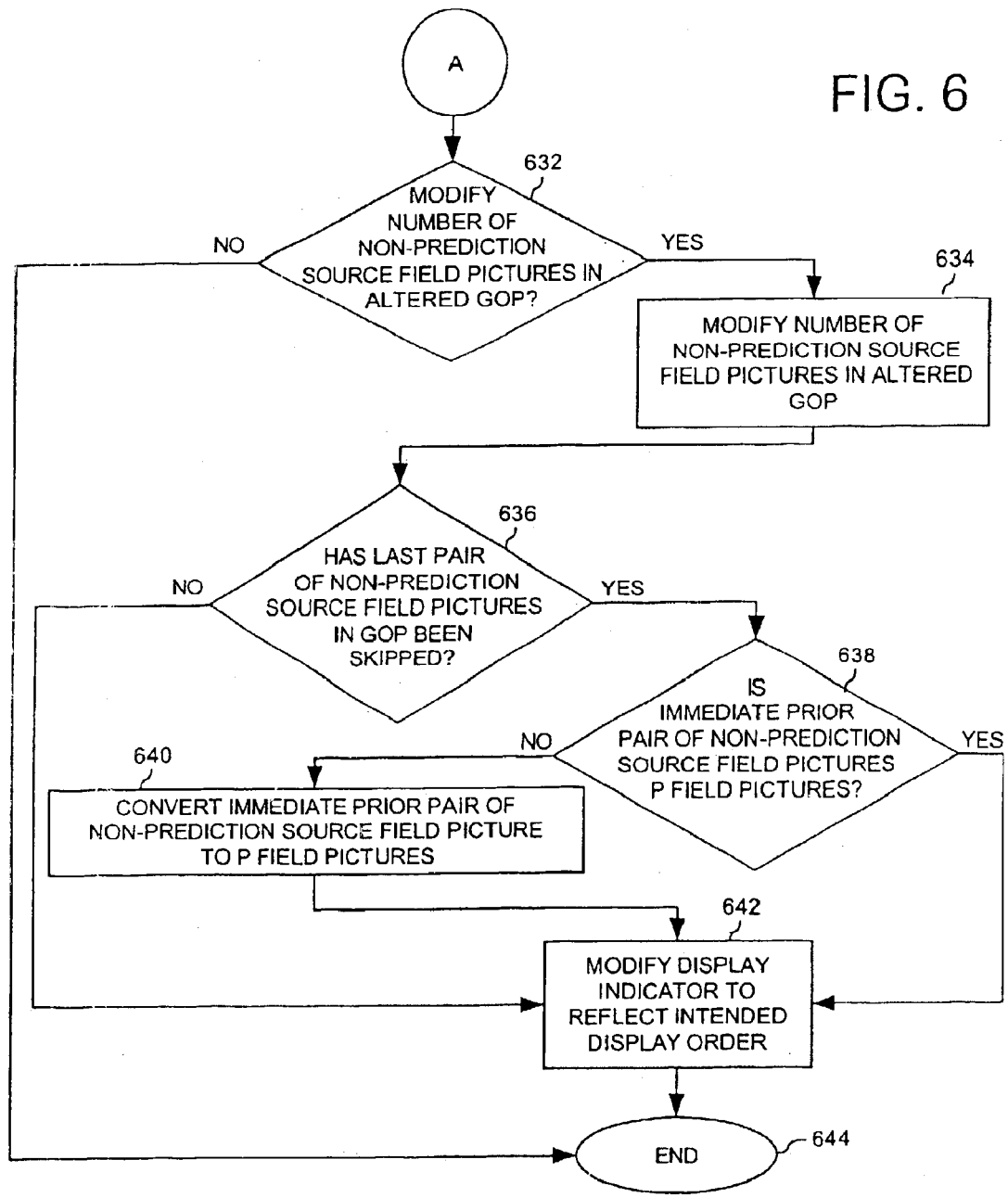

REVERSE TRICK MODES ON NON-PROGRESSIVE VIDEO USING SPECIAL GROUPS OF PICTURES

BACKGROUND OF THE INVENTION

1. Technical Field

The inventive arrangements relate generally to video systems and more particularly to video systems that record or play back digitally encoded video sequences.

2. Description of Related Art

Devices that facilitate the playback of video are gaining popularity in today's consumer electronics marketplace. For example, many consumers have purchased digital video disc (DVD) recorders or players for purposes of viewing previously recorded programs or recording their favorite programs. A DVD recorder or player typically contains a Moving Pictures Expert Group (MPEG) decoder to decode the digitally encoded multimedia data that is stored on the discs that the recorder or player plays. The MPEG video signal to be decoded is comprised of a plurality of groups of pictures (GOP), each of which typically contain an intra (I) picture, a plurality of predictive (P) pictures and a plurality of bidirectional predictive (B) pictures.

If the digital video recorder or player is connected to certain televisions, the digitally encoded signal will be decoded by the digital video recorder or players MPEG decoder before being displayed on the television. Significantly, however, many digital televisions (DTV) contain their own MPEG decoders. As such, if a digital video recorder or player is connected to a DTV, the video signal read from the disc is remotely decoded by the DTV's decoder. This type of decoder is considered a passive decoder in that the microprocessor in the digital video recorder or player has no control over the decoder. This configuration can be referred to as a remote decoder system.

During playback of a video signal, some viewers may wish to perform certain trick modes. A trick mode can be any playback of video in which the playback is not done at normal speed or in a forward direction. As an example, a reverse trick mode can be initiated to allow the viewer to locate portions of video that have already been played and that the viewer may wish to view again. The reverse trick mode can be at a normal speed or pictures in a GOP may be skipped to produce a fast-reverse trick mode. In addition, duplicates of the pictures in a GOP may be inserted in the GOP to generate a slow-reverse trick mode. To effectuate a reverse trick mode on an MPEG video signal, the decoder of the DVD may decode the pictures in a GOP in a forward direction. Once these pictures are decoded, the decoder is instructed to display the pictures in reverse order and if necessary, to add duplicate pictures to the GOP or to skip pictures in the GOP.

A remote decoder system, however, is not particularly suited to perform reverse trick modes. The reason for this drawback is that the microprocessor of the digital video recorder or player cannot instruct the decoder to display the pictures in reverse. As such, a reverse trick mode in such an arrangement is typically limited to merely sending to a decoder in a reverse order the I pictures in all or some of the GOPs of the video signal.

SUMMARY OF THE INVENTION

The present invention concerns a method of performing a reverse trick mode. The method includes the steps of receiving a non-progressive video signal and encoding the non-progressive video signal into at least one group of pictures having at least one prediction source picture and at least one non-prediction source picture. All the non-prediction source pictures are predicted from the at least one prediction source picture such that no non-prediction source picture is predicted from another non-prediction source picture.

In addition, the method can include the steps of recording the non-progressive video signal to a storage medium and playing back the non-progressive video signal. The method also includes the step of, in response to a reverse trick mode command, altering the display order of the group of pictures to permit the group of pictures to be displayed in reverse order.

The method can also include the step of modifying at least the number of non-prediction source pictures in the group of pictures in response to the reverse trick mode command. In one arrangement, the prediction source picture can be an intra picture. Further, at least a portion of the non-prediction source pictures can be bidirectional predictive pictures or predictive pictures. As an example, each of the bidirectional predictive pictures can be one-directional bidirectional predictive pictures.

In one aspect of the invention, the modifying step can include the step of skipping at least one non-prediction source picture in the group of pictures. Alternatively, the modifying step can include the step of inserting in the group of pictures a duplicate of at least one non-prediction source picture.

In another aspect, the at least one skipped non-prediction source picture can be a predictive picture being the last picture in display order in the group of pictures. In addition, the method can further include the step of converting an immediate prior non-prediction source picture in display order in the group of pictures into a predictive picture unless the immediate prior non-prediction source picture is a predictive picture.

In another arrangement, each of the prediction source picture and the non-prediction source pictures can contain a display indicator, and the method can further include the step of modifying the display indicator of at least a portion of the prediction source pictures and non-prediction source pictures to reflect an intended display order. As an example, the display indicator can be a temporal reference field. This modifying the display indicator step can be performed after the altering step or the modifying the number of non-prediction source pictures step.

The method can also include the step of, following the altering step, converting the last non-prediction source picture in the altered group of pictures to a predictive picture unless the last non-prediction source picture in the altered group of pictures is a predictive picture. Moreover, the method can include the step of, following the altering step, selectively converting to bidirectional predictive pictures the non-prediction source pictures in front of, in display order, the prediction source picture.

It is also understood that the method can include the step of performing the receiving and encoding steps in a remote decoder system. Additionally, the method can include the step of encoding at least a portion of the prediction and non-prediction source pictures into field pictures. The present invention also concerns a system for performing a reverse trick mode. The system includes a processor for encoding a non-progressive video signal into at least one group of pictures having at least one prediction source picture and at least one non-prediction source picture. All the non-prediction source pictures are predicted from the at least one prediction source picture such that no non-prediction source picture is predicted from another non-prediction source picture. The system also includes a decoder for decoding the non-progressive video signal. The processor is further programmed to, in response to a reverse trick mode command, alter the display order of the group of pictures to permit the group of pictures to be displayed in a reverse order. The system also includes suitable software and circuitry to implement the methods as described above.

DETAILED DESCRIPTION OF THE PREFERRED EMBODIMENTS

Figure 1A:
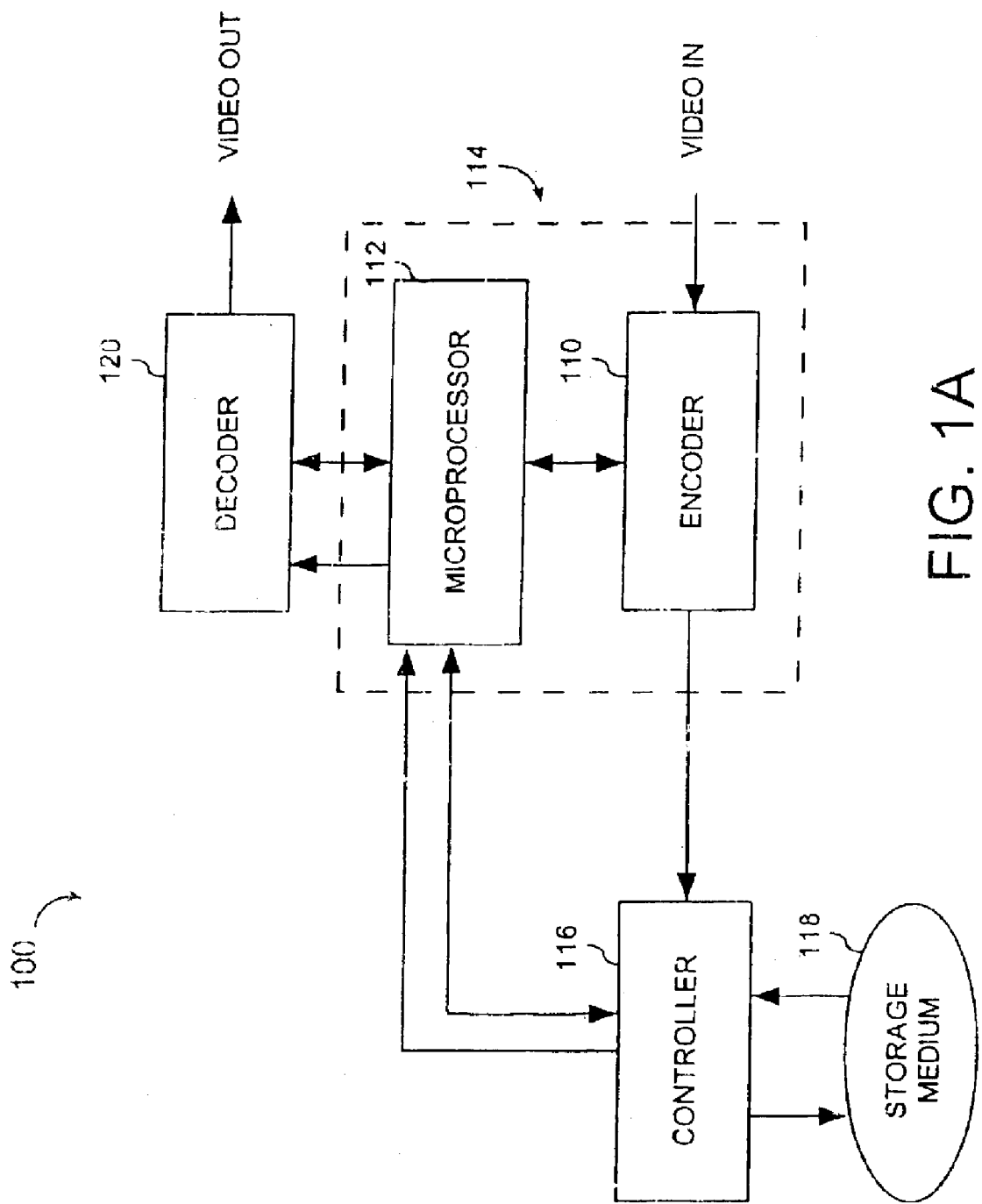
FIG. 1A is a block diagram of a system that can encode a video signal into special GOPs and perform a reverse motion trick mode in accordance with the inventive arrangements herein.

A system 100 for implementing the various advanced operating features in accordance with the inventive arrangements is shown in block diagram form in FIG. 1A. The invention, however, is not limited to the particular system illustrated in FIG. 1A, as the invention can be practiced with any other system capable of receiving a video signal, processing the signal and outputting the signal to any suitable component, such as a display device. In addition, the system 100 is not limited to reading data from or writing data to any particular type of storage medium, as any storage medium capable of storing digitally encoded data can be used with the system 100.

The system 100 can include an encoder 110 for encoding an incoming video signal, and a microprocessor 112 for instructing the encoder 110 to encode the video signal in accordance with various techniques, some of which will be explained later. All or portions of the encoder 110 and the microprocessor 112 can be considered a processor 114 within contemplation of the present invention. The encoder 110 can be located in the same apparatus as the microprocessor 112 or, alternatively, can be positioned in a device that is remote from the apparatus housing the microprocessor 112. If the encoder 110 is remotely located, the encoder 110 is not necessarily under the control of the microprocessor 112.

The system 100 can also include a controller 116 for reading data from and writing data to a storage medium 118. For example, the data can be a digitally encoded video signal. The system 100 can also have a decoder 120 for decoding the encoded video signal when it is read from the storage medium 118 and transferring the decoded video signal to a suitable component, such as a display device. The decoder 120 can be mounted in the same apparatus containing the encoder 110 (if the encoder 110 is not remotely located), the microprocessor 112 and the controller 116 or may be mounted in a separate device, such as that found in a remote decoder system.

Control and data interfaces can also be provided for permitting the microprocessor 112 to control the operation of the encoder 110 (as noted above), the controller 116 and the decoder 120. Suitable software or firmware can be provided in memory for the conventional operations performed by the microprocessor 112. Further, program routines can be provided for the microprocessor 112 in accordance with the inventive arrangements In operation, the encoder 110 can receive and encode an incoming non-progressive video signal. As is known in the art, this type of video signal is comprised of pictures that have been non-progressively scanned, i.e., the pictures were created through an interlaced scanning technique. In accordance with the inventive arrangements, the microprocessor 112 can instruct the encoder 110 to encode the incoming video signal into one or more GOPs that are particularly useful for performing trick modes. Examples of such GOPs will be presented below. The encoder 110 can then transfer the encoded video signal to the controller 116, which can record the signal onto the storage medium 118. In the case where the encoder 110 is remotely located, the encoder 110 can encode the incoming non-progressive video signal, but the encoding instructions are not necessarily received from the microprocessor 112.

If the microprocessor 112 receives a playback command, the microprocessor 112 can instruct the controller 116 to read the encoded video signal from the storage medium 118.

The controller 116 can transfer the signal to the microprocessor 112, which can send the signal to the decoder 120. The decoder 120 can decode the video signal and output the signal for display on a suitable device. If the microprocessor 112 receives a trick mode command, the microprocessor 112 can skip pictures in the GOPs, insert duplicates of the pictures into the GOPs or cause the display of any combination of the pictures in a reverse order.

Figure 1B:
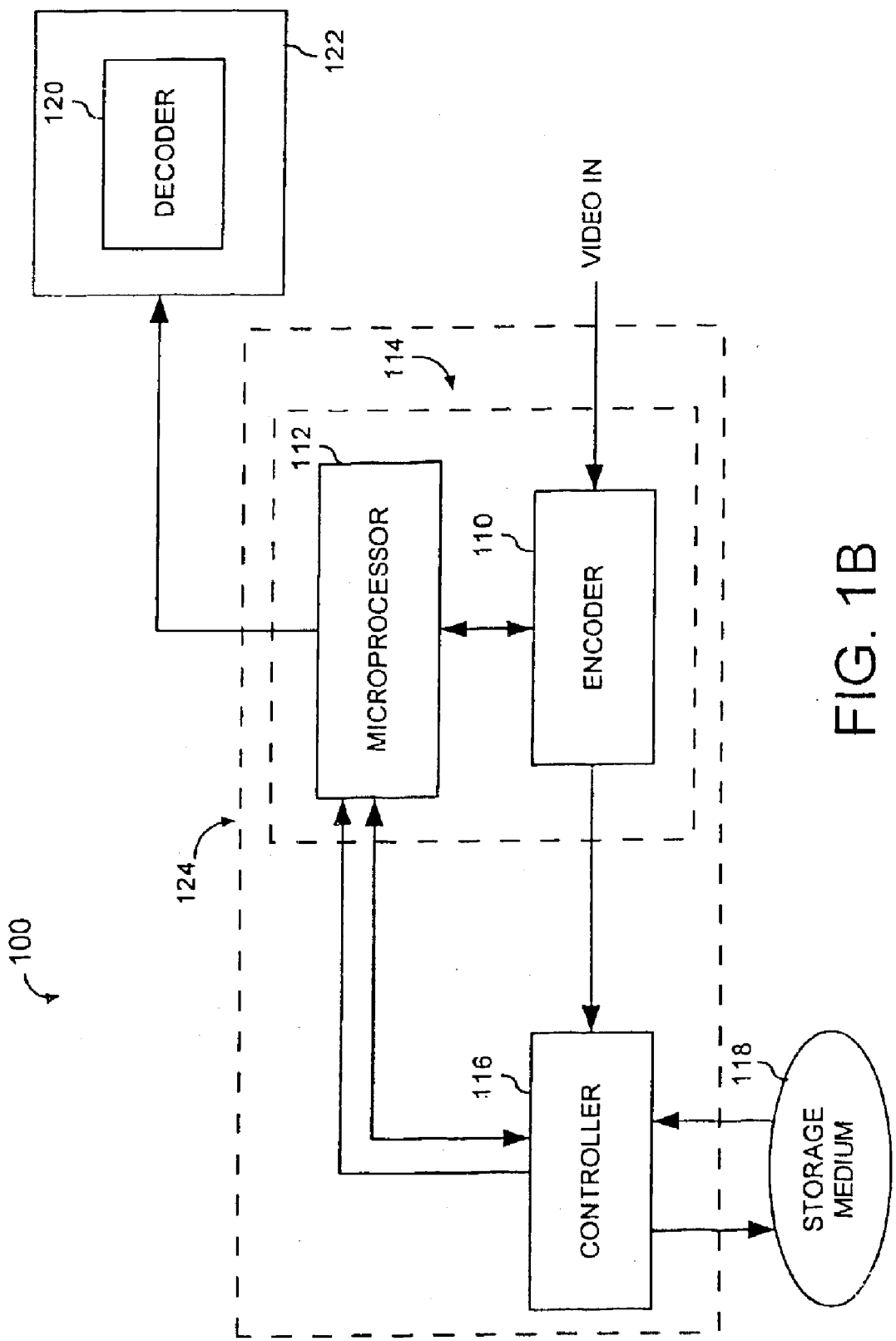
FIG. 1B is a block diagram of an another system that can encode a video signal into special GOPs and perform a reverse motion trick mode in accordance with the inventive arrangements.

As alluded to earlier, there may be some instances in which the decoder 120 that performs the decoding step is located in a device separate from the apparatus containing the microprocessor 112. An example of such an arrangement, or a remote decoder system, is illustrated in FIG. 1B in which the decoder 120 is in a display device 122, separate from a multimedia device 124 that can house the microprocessor 112. In this case, the decoder 120 may not be under the control of the microprocessor 112. Nonetheless, trick modes may still be performed in this system 100 in which the microprocessor 112 may alter the display order of the pictures in the GOP prior to decoding to permit the pictures to be displayed in a reverse order. In addition, the microprocessor 112 may delete pictures or insert duplicates of the pictures in the GOP prior to it being decoded by the decoder 120 in the display device 122. It is understood that the encoder 110 in this type of system may be remotely located as well.

In another embodiment, during the encoding step, the pictures in the non-progressive video signal can be encoded into field pictures, which can help avoid a vibration artifact, which will be discussed later. Encoding the non-progressive pictures into field pictures can permit the microprocessor 112 to transmit the field pictures to a remotely located decoder in a manner that can help control such a vibration problem. This process will be discussed later.

In either of the arrangements discussed in relation to FIGS. 1A and 1B, the GOPs created during the encoding process will facilitate efficient implementation of a reverse trick mode. The overall operation of the invention will be discussed in detail below.

Reverse Trick Mode on Non-Progressive Video Using Special Groups of Pictures

Figure 2:
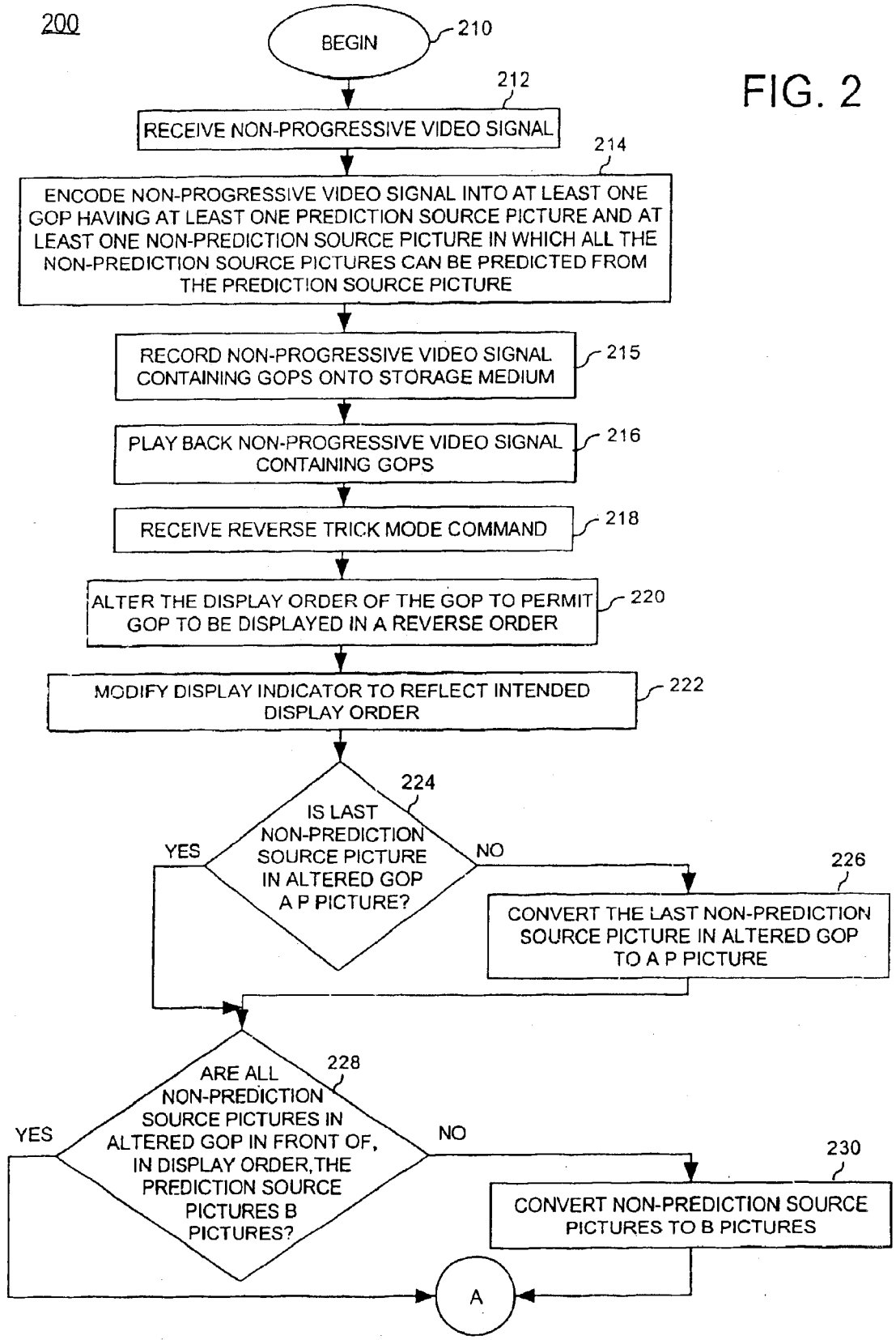
FIG. 2 is a flow chart that illustrates a method of encoding a video signal into special GOPs and performing a reverse motion trick mode in accordance with the inventive arrangements.

Referring to FIG. 2, a method 200 that demonstrates one way to perform a trick mode on a non-progressive video signal using special GOPs is illustrated. The method 200 can be practiced in any suitable system capable of encoding and decoding a video signal. The method 200 can begin, as shown at step 210. At step 212, a non-progressive video signal can be received. As noted earlier, a non-progressive video signal contains pictures that have been non-progressively scanned, i.e., scanned through an interlaced scanning technique.

As shown at step 214, the non-progressive video signal can be encoded into at least one GOP having at least one prediction source picture and at least one non-prediction source picture. In one arrangement, all the non-prediction source pictures can be predicted from the prediction source picture such that no non-prediction source picture is predicted from another non-prediction source picture.

Figure 3:
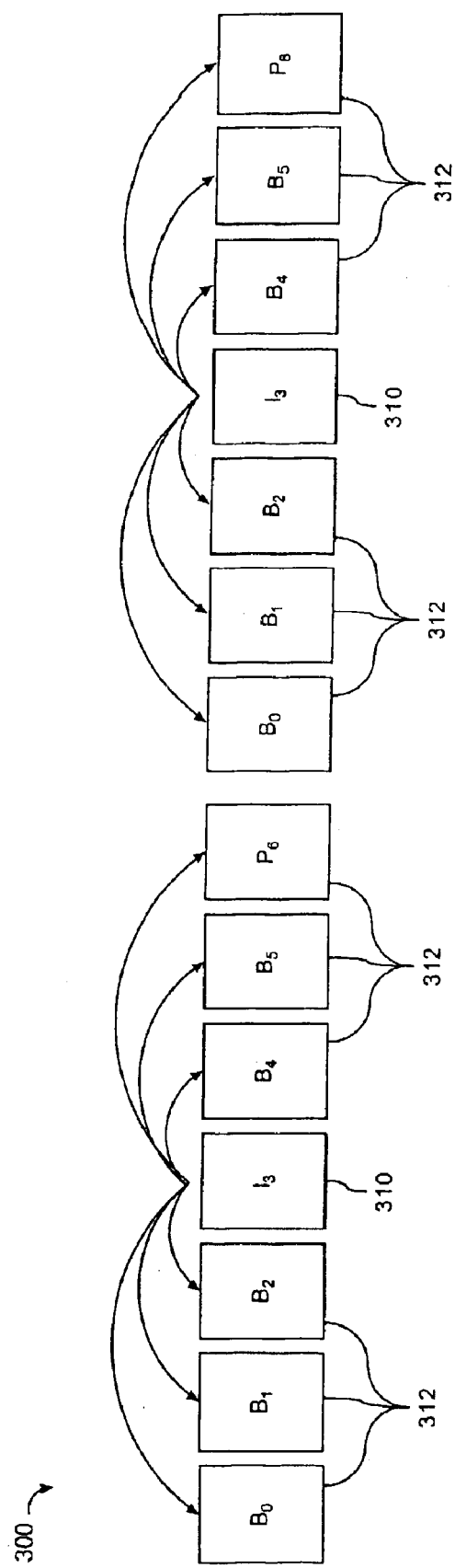
FIG. 3 illustrates an example of a special GOP in accordance with the inventive arrangements.

Referring to FIG. 3, an example of such a process is shown. In this particular arrangement, the video signal can be encoded into one or more GOPs 300. The GOPs 300 are shown in display order. Each of the GOPs 300 can include at least one prediction source picture 310 and at least one non-prediction source picture 312. These pictures are non-progressive pictures having at least a top field and a bottom field. The pictures are shown in complete form; the illustration does not show them separated into their respective fields. A prediction source picture is a picture in a GOP that is not yet predicted from another picture yet can be used to predict other pictures in the GOP. In addition, a non-prediction source picture can be any picture in a GOP that can be predicted from a prediction source picture in that GOP.

As an example, the prediction source picture 310 can be an I picture, and the non-prediction source pictures 312 can be B and/or P pictures. Each of the non-prediction source pictures 312 can be predicted from the prediction source picture 310, which in this example correlates to each of the B and P pictures being predicted from the I picture. Because P pictures can serve as non-prediction source pictures 312, it should be apparent that a non-prediction source picture 312 is not limited to pictures from which no other pictures can ever be predicted, such as B pictures.

In accordance with the inventive arrangements, however, each of the non-prediction source pictures 312 can be predicted from the prediction source picture 310 only. In one arrangement, the B pictures can be one-directional prediction pictures such that the B pictures, prior to, or in front of the I picture (in display order) can be backward predicted from the I picture, and the B pictures behind the I picture (in display order) can be forward predicted from the I picture. The subscript numbers incorporated into the prediction source pictures 310 and the non-prediction source pictures 312 can indicate the order in which each of these pictures will be displayed—relative to the other pictures in the GOP—at a normal (forward) playback speed.

As noted earlier, the GOP 300 is shown in display order. The transmission order is slightly different in that the prediction source picture 310, in this example picture $I_3$, can be transmitted to a decoder first followed by the non-prediction source pictures 312 that will be predicted from the prediction source picture 310.

It is important to note that the invention is in no way limited to these particular GOPs 300, as they represent merely one example of a GOP structure in accordance with the inventive arrangements. In fact, any GOP in which all the non-prediction source pictures in the GOP can be predicted from a prediction source picture in that GOP is within contemplation of the inventive arrangements.

Moreover, although only two GOPs 300 are shown in FIG. 3 in which each GOP 300 has one prediction source picture 310 and six non-prediction source pictures 312, it is understood that the received video signal can be encoded into any suitable number of GOPs 300 having any suitable number of prediction source pictures 310 and non-prediction source pictures 312.

Also, if more than one prediction source picture 310 is in the GOP 300, any B pictures in the GOP 300 can be bidirectionally predicted. As an example, more than one prediction source picture 310 can be positioned in the GOP 300 and some of the non-prediction source pictures 312 can be predicted from these prediction source pictures 310. As such, the prediction source pictures 310 can be transmitted to a decoder before the non-prediction source pictures 312 that are dependent on these prediction source pictures 310 for their prediction.

Figure 4A:
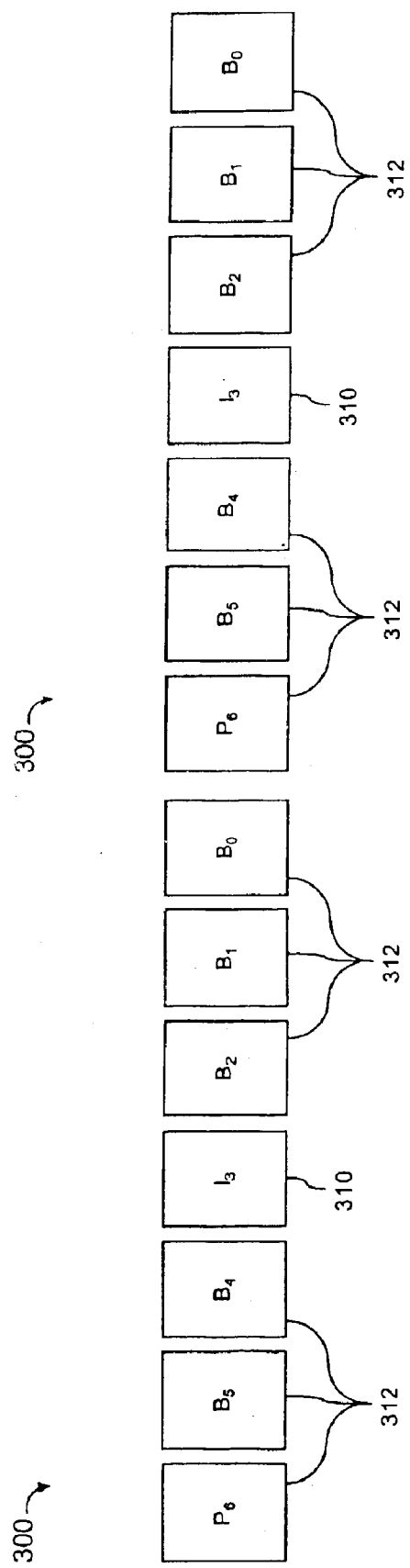
FIG. 4A illustrates the GOP of FIG. 3 in reverse order in accordance with the inventive arrangements.

Referring back to method 200 of FIG. 2, at step 215, the non-progressive video signal containing the GOPs can be recorded onto a suitable storage medium. Once recorded, the non-progressive video signal containing the GOPs can be played back, as shown at step 216. At step 218, a reverse trick mode command can be received. In response, the display order of the GOP can be altered to cause the GOP to be displayed in a reverse order, as shown at step 220. An example of such a step is illustrated in FIG. 4A.

Here, each of the GOPs 300, as first depicted in FIG. 3, is shown with the prediction source pictures 310 and the non-prediction source pictures 312 in reverse order. Again, these non-progressive pictures are shown as being intact, as they have not been separated into their respective fields. Altering the display order of the pictures in the GOP 300 may be helpful in performing a reverse trick mode, especially in a remote decoder system. The reason such a process is particularly useful in this type of system is because the decoder in a remote decoder system cannot receive instructions that direct it to display pictures in a reverse order. It is understood, however, that the method 200 is in no way limited to application in a remote decoder system.

The prediction source pictures 310 and the non-prediction source pictures 312 shown in FIG. 3 can contain display indicators. In one arrangement, the display indicator can be a temporal reference field. A temporal reference field is typically a ten bit field located in the picture header of digitally encoded pictures. Some decoders rely on the temporal reference field to determine when a particular picture in a video signal will be displayed relative to other pictures in the video signal. This field normally has an integer value.

Referring back to FIG. 3, as an example, each GOP 300 contains seven pictures. The subscript numbers for the pictures in each GOP 300 can correspond to the integer values for each respective picture's temporal reference field. For instance, the temporal reference field of the first non-prediction source picture 312, or picture $B_0$, can have an integer value of zero, which indicates that this particular picture will be the first one in each GOP 300 to be displayed. The temporal reference field of picture $B_1$, the next picture to be displayed, can have an integer value of one. Thus, the integer value of the temporal reference field for each subsequent picture to be displayed can be higher by one, all the way to picture $P_6$, whose temporal reference field can have an integer value of 6. For convenience, the phrase "integer value of the temporal reference field" can also be referred to as "integer value."

When the display order of the pictures in the GOP 300 is altered to permit the GOP to be displayed in a reverse order, as shown in FIG. 4A, the original display indicators or integer values are no longer valid. As such, referring back to method 200 of FIG. 2, the display indicators of the prediction source pictures and the non-prediction source pictures can be modified to reflect an intended display order, as shown at step 222.

Figure 4B:
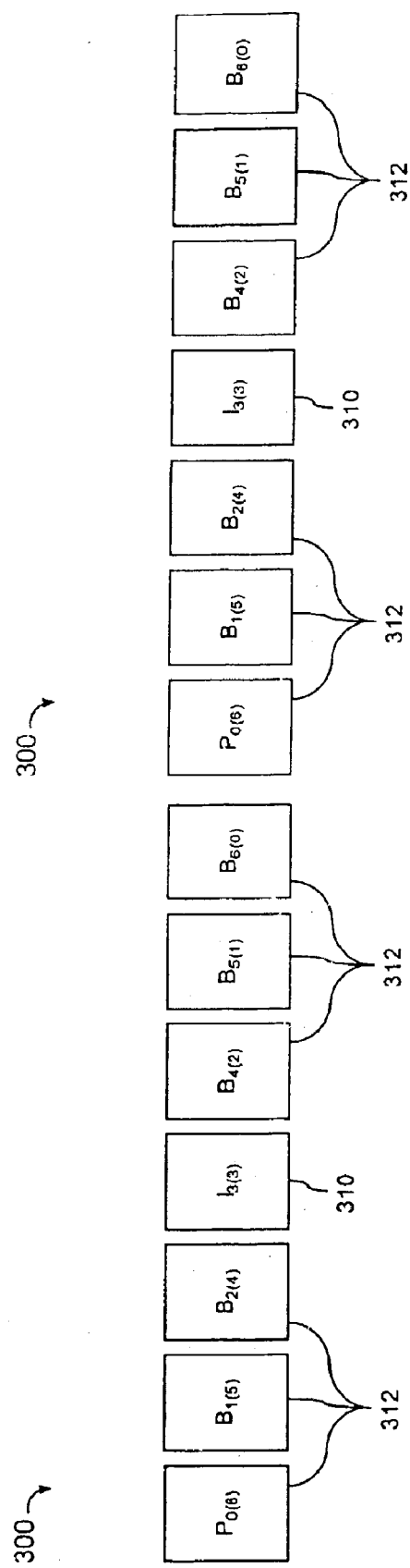
FIG. 4B illustrates the GOP of FIG. 4A with modified display indicators in accordance with the inventive arrangements.

An example of the result of this step is illustrated in FIG. 4B. Here, the new integer values that reflect the new display order are shown. The original integer values are shown in parentheses. Although the integer value for the prediction source pictures 310 in this example did not change, it must be noted that the invention is not limited in this regard; it may be necessary, based on the GOP structure, to modify the integer value of the prediction source picture 310 as well.

It is understood that the invention is not limited to this particular example, as other ways to modify the integer values of the relevant temporal reference fields to reflect an intended display order can be performed in any other suitable fashion. Moreover, it should be noted that the invention is not limited to the use of a temporal reference field, as any other suitable display indicator can be modified to reflect an intended display order in either of the embodiments discussed above.

Figure 4C:
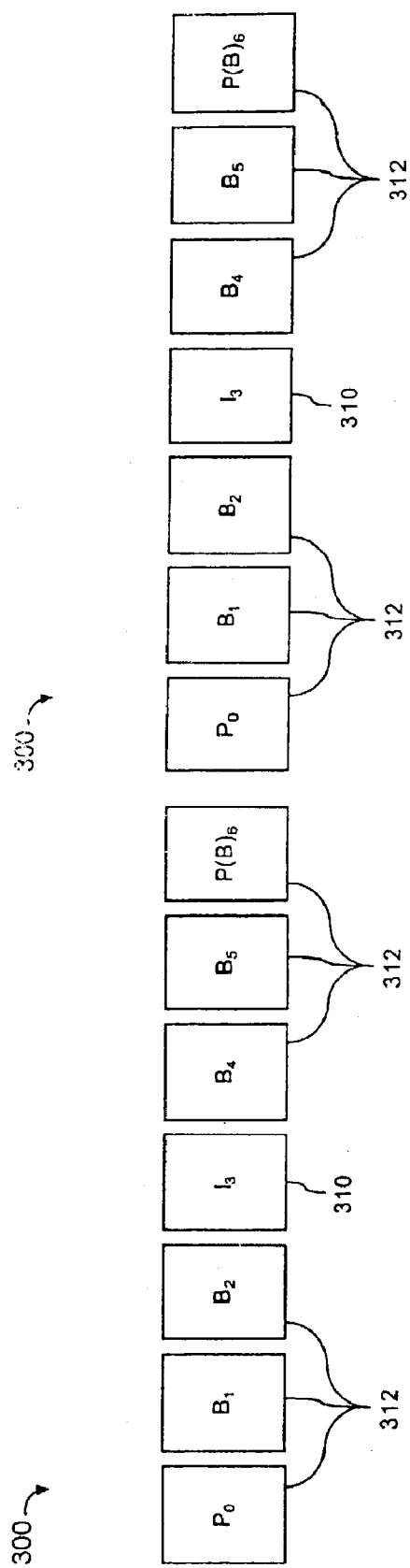
FIG. 4C illustrates the GOP of FIG. 4B with a converted picture in accordance with the inventive arrangements.

Referring once again to method 200 of FIG. 2, at decision block 224, it can be determined whether the last non-prediction source picture in the altered GOP is a P picture. For purposes of the invention, the term "altered GOP" refers to a GOP in which the display order of the pictures in the GOP has been altered to permit the GOP to be displayed in a reverse order. If yes, the method 200 can resume at step 228. If it is not, the last non-prediction source picture in the GOP can be converted to a P picture, as shown in step 226. An example of this process is shown in FIG. 4C.

The last non-prediction source picture 312 in the GOP 300, which was originally picture $B_6$, has been converted to a P picture, or picture $P_6$. The reason for this conversion is that specifications for MPEG video require that the last picture in a GOP be a P picture or an I picture. As an example, a B picture can be converted to a P picture by setting by setting to P picture values the following parameters located in the picture header of the B picture: picture_coding_type; full_pel_backward_vector; and backward_f_code. Additionally, the following variable length codes for macroblock_type can be set to P picture values: macroblock_quant; macroblock_motion_forward; macroblock_motion_backward; macroblock_pattern; macroblock_intra; spatial_temporal_weight_code_flag; and permitted spatial_temporal_weight_classes.

This step can instruct a decoder to decode the picture as a P picture. As such, in accordance with the inventive arrangements, the display order of a GOP can be altered to permit the GOP to be displayed in a reverse order without violating the MPEG requirement that the last picture in a GOP be a P picture.

Referring back to method 200 of FIG. 2, at decision block 228, it can be determined whether all the non-prediction source pictures in the altered GOP that are in front of, in display order, the prediction source picture are B pictures. If they are, the method 200 can continue at decision block 232 through jump circle A. If they are not, then such non-prediction source pictures can be converted to B pictures, as shown at step 230.

Figure 4D:
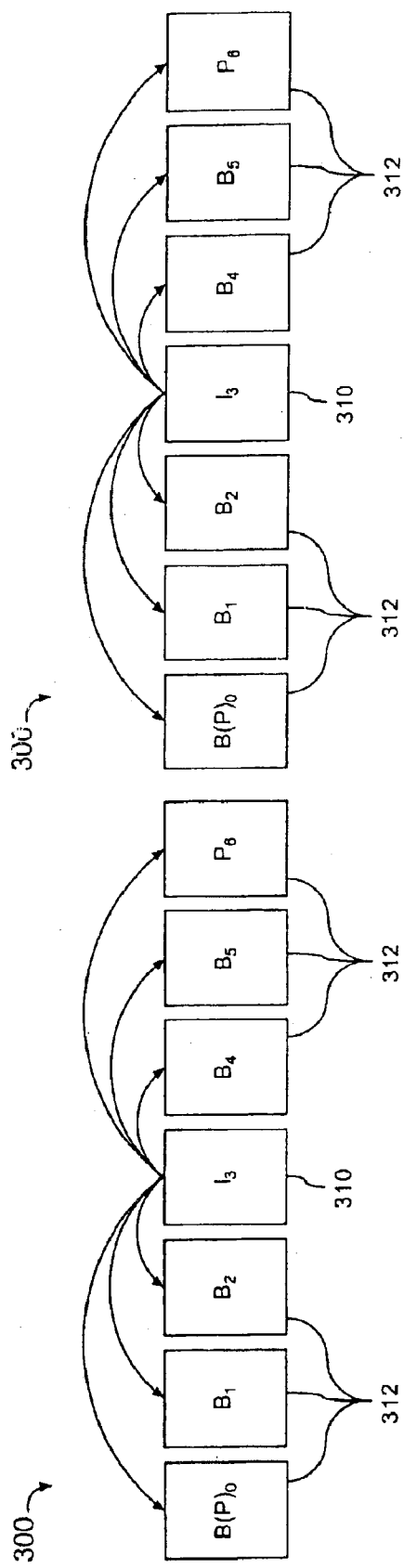
FIG. 4D illustrates the GOP of FIG. 4C with another converted picture in accordance with the inventive arrangements.

For example, referring to FIG. 4D, following the alteration of the display order, the first non-prediction source picture 312 was a P picture, or picture $P_0$, which is shown in parentheses. In accordance with step 228, picture $P_0$ can be converted to picture $B_0$. In one arrangement, a P picture can be converted to a B picture by setting by setting to B picture values the following parameters located in the picture header of the P picture: picture_coding_type; full_pel_backward_vector; and backward_f_code. Additionally, the following variable length codes for macroblock_type can be set to B picture values: macroblock_quant; macroblock_motion_forward; macroblock_motion_backward; macroblock_pattern; macroblock_intra; spatial_temporal_weight_code_flag; and permitted spatial_temporal_weight_Classes.

Because non-prediction source pictures 312 before (in display order) the prediction source picture 310 will be backward predicted pictures, converting such P pictures into B pictures improves the prediction scheme of the GOP 300, as P pictures cannot be backward predicted; they can only be forward predicted. The prediction scheme to be used with the altered GOP is shown in FIG. 4D.

Thus far, the GOP 300 has been described in relation to a reverse trick mode in which the pictures in the GOP 300 are displayed in a reverse order at a normal playback speed (normal playback speed is 1x). There are, however, certain instances in which viewers may wish to view video in reverse at speeds different from 1×, such as a fast-reverse or slow-reverse trick mode. Typically, the speed of video may be changed by either adding pictures to or skipping pictures in the video.

Referring back to FIG. 2, it can be determined whether the number of non-prediction source pictures in the altered GOP are to be modified, as shown at decision block 232 through jump circle A. If it is not, the method 200 can end at step 244. If the number of pictures in the altered GOP is to be modified, such a process can be performed at step 234. Several examples are shown in FIGS. 5A through 5D.

Figure 5A:
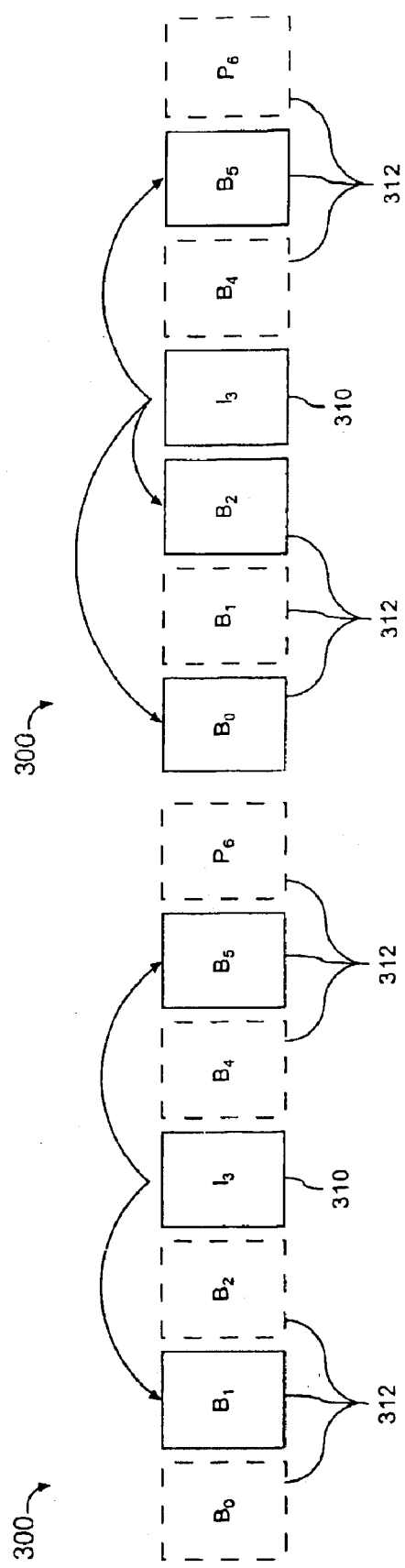
FIG. 5A illustrates one example of skipping pictures in the GOP of FIG. 4D in accordance with the inventive arrangements.

Referring to FIG. 5A, each of the altered GOPs 300 (as illustrated in FIG. 4D) is shown with several non-prediction source pictures 312 removed or skipped. Specifically, pictures $B_0$, $B_2$, $B_4$ and $P_6$ in the GOP 300 on the left can be skipped, while pictures $B_1$, $B_4$ and $P_6$ in the GOP 300 on the right can be skipped. Skipping such non-prediction source pictures 312 can cause the reverse playback speed to increase. Here, the number of non-prediction source pictures 312 skipped, one-half of all the pictures in the two GOPs 300, correlates to a playback speed that is twice the speed of normal playback, or 2×.

In accordance with the inventive arrangements, any one of the non-prediction source pictures 312 in the GOPs 300 can be skipped to increase the reverse playback speed of the video signal without affecting the prediction of any remaining non-prediction source pictures 312 in the GOPs 300. This feature is made possible by the encoding process described above. A step for placing the GOPs 300 in accordance with the MPEG standard, for example, will be discussed later.

Of course, it is understood that the invention is not limited to the example described in relation to FIG. 5A, as the ability to skip all non-prediction source pictures 312 in any order during a fast-reverse trick mode applies to any other GOP in which the non-prediction source pictures 312 are predicted from a prediction source picture 310. Also, the entire GOP 300 may be skipped to produce a faster playback.

Figure 5B:
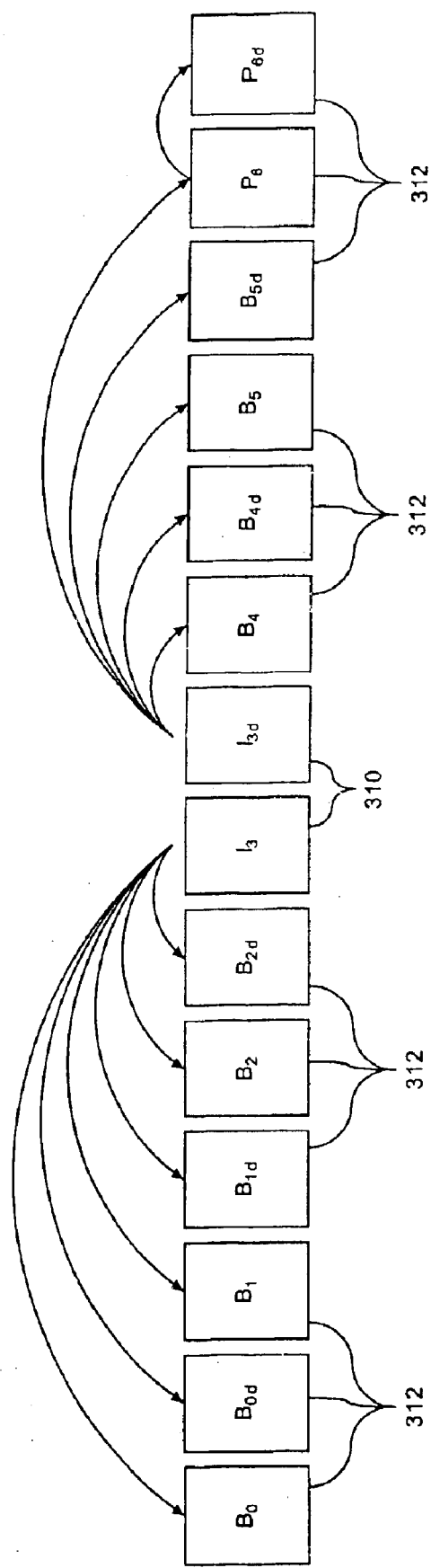
FIG. 5B illustrates an example of inserting duplicate pictures in the GOP of FIG. 4D in accordance with the inventive arrangements.

Referring back to FIG. 2, the modifying step 234 can also include the step of inserting in the altered GOP a duplicate of at least one prediction source picture or non-prediction source picture to produce a slow-reverse trick mode. An example of such an operation is shown in FIG. 5B. Here, a duplicate of each prediction source picture 310 and non-prediction source picture 312 can be inserted into the altered GOP 300 (for convenience, only one GOP 300 is shown). This particular example can produce a playback speed of 12×. The subscript letter "d" represents the picture to which it is associated as a duplicate of the immediate preceding picture.

Similar to the original non-prediction source pictures 312, the duplicates of such pictures may be predicted from a prediction source picture 310 (in accordance with the MPEG standard, the last picture in the GOP 300, duplicate picture $P_{6d}$, can be predicted from the immediate prior P picture, which in this case is picture $P_6$). In addition, the original non-prediction pictures 312 and their duplicates may be predicted from the duplicate of a prediction source picture 310.

The example presented in FIG. 5B is explained as follows: all the non-prediction source pictures 312 and their duplicates in front (in display order) of the original prediction source picture 310, or picture $I_3$, may be predicted from picture $I_3$. Additionally, the original non-prediction source pictures 312 and their duplicates behind (in display order) the duplicate of the original prediction source picture 310, or picture $I_{3d}$, may be predicted from duplicate picture $I_{3d}$ (with the exception of duplicate picture $P_{6d}$). It is understood, however, that this particular arrangement is merely an example, as the non-prediction source pictures 312 and their duplicates can be predicted from any other suitable prediction source picture 310, including any duplicate of a prediction source picture 310.

In another arrangement, one or more of the duplicate pictures inserted in the altered GOP 300 can be dummy B or dummy P pictures. A dummy B or a dummy P picture is a B or P picture, respectively, in which the dummy picture's motion vectors are set to zero and its residual signal is set to zero or not encoded. For example, the duplicate of the prediction source picture 310 (picture $I_3$) in the altered GOP 300 can be a dummy P picture instead of another I picture, such as picture $I_{3d}$. Similarly, the duplicate for the last non-prediction picture 312 (picture $P_6$) can be a dummy P picture rather than a conventional P picture, such as picture $P_{6d}$. Using dummy B or P pictures during a trick mode can lower the bit rate of the video signal, which may be necessary in certain circumstances, particularly when the method 200 is being performed in a remote decoder system.

Referring back to FIG. 2, at decision block 236, it can be determined whether the last non-prediction source picture in the altered GOP has been skipped. If no, the method 200 can resume at step 242. If yes, it can be determined at decision block 238 whether the immediate prior non-prediction source picture in display order in the altered GOP is a P picture. If it is, the method 200 can continue at step 242. If it is not, then the immediate prior non-prediction source picture in the altered GOP can be converted into a P picture, as shown at step 240.

Figure 5C:
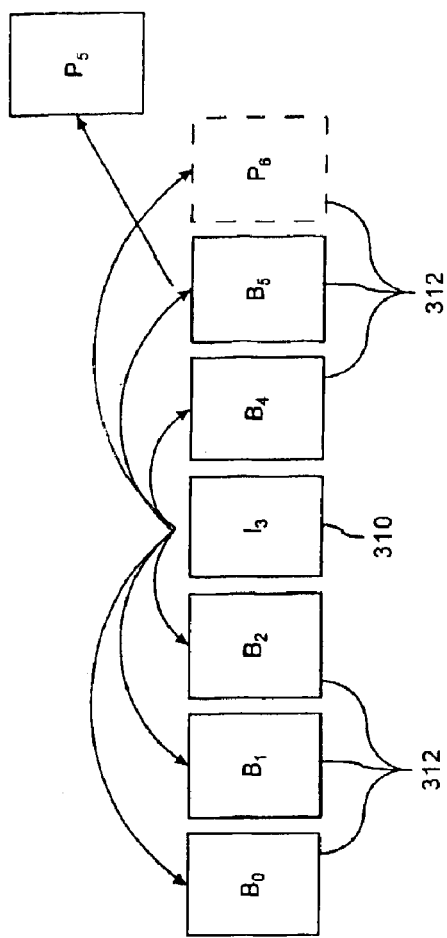
FIG. 5C illustrates another example of skipping pictures in the GOP of FIG. 4D in accordance with the inventive arrangements.

An example of this operation is illustrated in FIG. 5C. As noted earlier, the specifications for MPEG video require that the last picture in a GOP be a P picture or an I picture. Thus, if picture $P_6$ in the altered GOP 300, a non-prediction source picture 312, were skipped during a fast-reverse trick mode, the last picture in the GOP 300 (if it is not skipped) would be picture $B_5$, a violation of the MPEG standard. To satisfy the MPEG requirement, the immediate prior non-prediction source picture 312, in this case, picture $B_5$, can be converted into a P picture, or picture $P_5$. This conversion has been previously discussed, and it is unnecessary to present it here. As such, the last picture in an altered GOP 300 can be skipped without violating the MPEG requirement that the last picture in a GOP be a P picture (or an I picture).

Referring back to the method 200 of FIG. 2, at step 242 (similar to step 222) the display indicators of the prediction source pictures and the non-prediction source pictures can be modified. Modifying the display indicators of these pictures can reflect an intended display order of the altered GOP when any one of the prediction source or non-prediction source pictures is skipped or duplicated.

When, for example, a non-prediction source picture is skipped, the previous display order is no longer valid. Accordingly, the display indicators of the prediction source pictures and the non-prediction source pictures that follow the skipped picture can be modified to indicate a proper display order. This feature is also applicable if duplicates of the prediction source pictures or the non-prediction source pictures are inserted in the altered GOP.

Figure 5D:
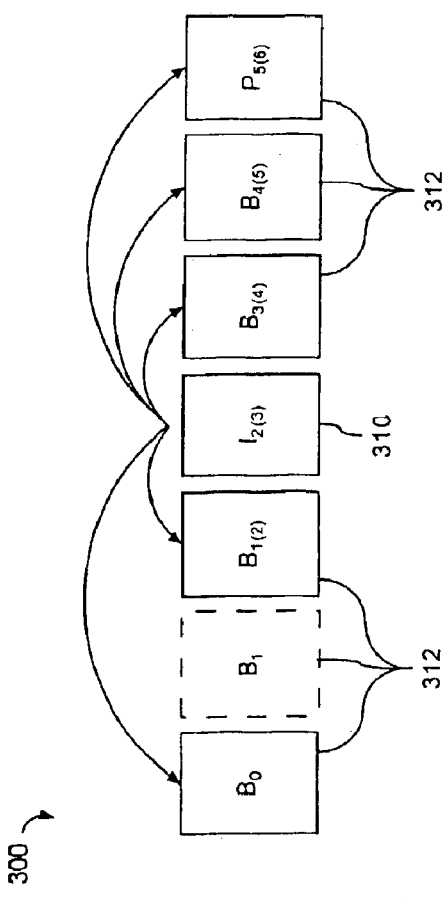
FIG. 5D illustrates yet another example of skipping pictures in the GOP of FIG. 4D and modifying display indicators of any remaining pictures in accordance with the inventive arrangements.

As an example, referring to FIG. 5D, if picture $B_1$ in the altered GOP 300 is skipped, then the integer values of the, prediction source pictures 310 and the non-prediction source pictures 312 that follow this picture can be decreased by a value of one. So, the integer value of the temporal reference field of picture $B_2$ can be modified from two to one, the integer value of the temporal reference field of picture $I_3$ can be modified from three to two and so on.

In this particular example, the new integer values are shown, the skipped picture $B_1$ is represented by a dashed outline and the old integer values are in parentheses. This modification process can continue until the end of the altered GOP 300 is reached and can ensure that the remaining pictures in the altered GOP 300 will be displayed in a proper order. Each time a prediction source picture 310 or a non-prediction source picture 312 in an altered GOP is skipped, the integer values of the temporal reference fields of the remaining pictures in that GOP that follow the skipped picture can be decreased by a value of one. Also, if pictures in the altered GOP are duplicated, the integer values of the pictures that follow the added duplicates can be increased by a value of one each time a duplicate is added. Referring back to FIG. 2, the method 200 can stop at step 244.

Figure 6:
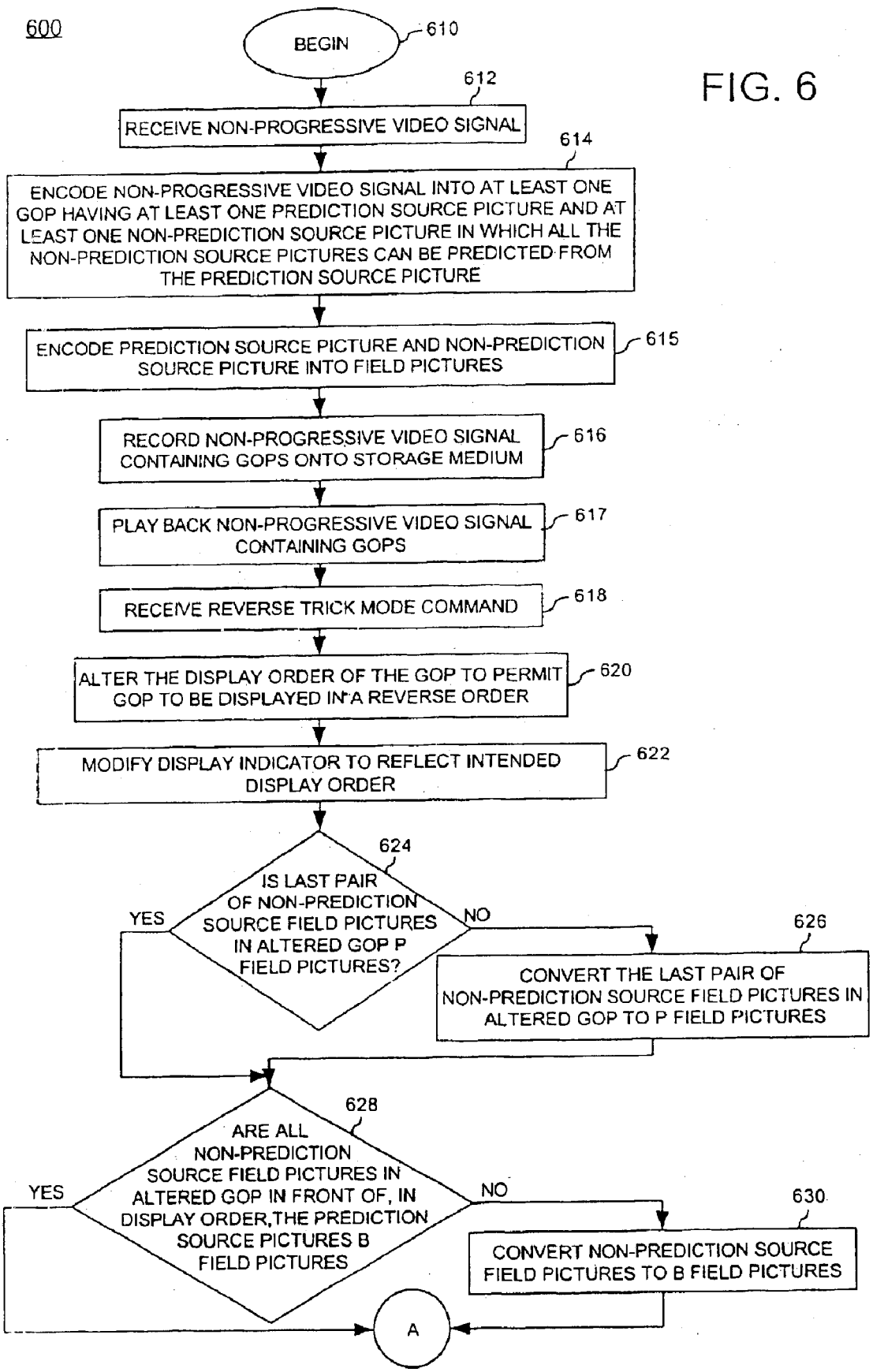
FIG. 6 is a flow chart illustrating an alternative method of encoding a video signal into special GOPs and performing a reverse motion trick mode using in accordance with the inventive arrangements.

Referring to FIG. 6, a method 600 that demonstrates another way to perform a reverse trick mode on a non-progressive video signal using special GOPs is illustrated. Similar to method 200 of FIG. 2, the method 600 can begin at step 610, and a non-progressive video signal can be received, as shown at step 612. Also, like step 214 of method 200, the non-progressive video can be encoded into at least one GOP having at least one prediction source picture and at least one non-prediction prediction source picture in which all the non-prediction source pictures can be predicted from the prediction source picture, as shown in step 614.

In this arrangement, the encoded non-progressive video signal may be eventually decoded in a remote decoder system. As noted earlier, in a remote decoder system, the components used to encode and read from a storage medium the non-progressive video signal have no control over the decoder. This lack of control over the decoder may cause problems with the display of non-progressive video, particularly during a slow trick mode. Before explaining the problems associated with performing trick modes in such a system, a brief explanation of interlaced scanning, the technique by which non-progressive pictures are generated, is warranted.

Under the interlaced scanning format, a video signal is typically divided into a predetermined number of horizontal lines. During each field period, only one-half of these lines are scanned; generally, the odd-numbered lines are scanned during the first field period, and the even-numbered lines are scanned during the next field period. Each sweep is referred to as a field, and when combined, the two fields form a complete picture or frame. For an NTSC system, sixty fields are displayed per second, resulting in a rate of thirty frames per second.

As a moving object moves across the screen in an interlaced scanning television, each field will only display a portion of the moving object. This partial display occurs because a field only displays every other horizontal line of the overall picture. For example, for a particular field n, only the odd-numbered horizontal lines are scanned, and the portion of the moving object that will be displayed in field n is the portion that is scanned during the odd-numbered horizontal line sweep for field n. The next field, field n+1, is created 1/60 of a second later and will display the even-numbered horizontal lines of the picture. Thus, the portion of the moving object that is displayed in field n+1 is the portion that is scanned during the even-numbered horizontal line sweep for field n+1. Although each field is temporally distinct, the human eye perceives the sequential display of the fields as smooth motion due to the speed at which the fields are displayed.

If a viewer activates a trick mode, the trick mode video signal may contain repeated pictures, pictures that were recorded under the interlaced scanning format. For example, if the viewer initiates a slow reverse trick mode on a particular picture, then that picture can be repeatedly transmitted to and decoded and displayed at a digital television, for example, containing the remote decoder. The display of the repeated pictures, however, is in accordance with the normal display of non-progressive pictures, i.e, the top and bottom fields that make up the non-progressive picture are alternately displayed. These fields are alternately displayed based on the slow trick mode playback speed. For example, for a playback speed of 1/3×(1×represents normal playback speed), each field will be displayed three times in an alternating fashion.

If a moving object appears in the pictures recorded under the interlaced scanning format, each field will display the moving object in one specific position. Thus, as fields from one frame or picture are alternately displayed during the slow reverse trick mode, the moving object in the display rapidly moves back and forth from the one position in the display to the other, in effect, the moving object appears to vibrate. This vibration is created because the interlaced fields are temporally distinct, and the moving object appears in a different position for each field.

Figure 7A:
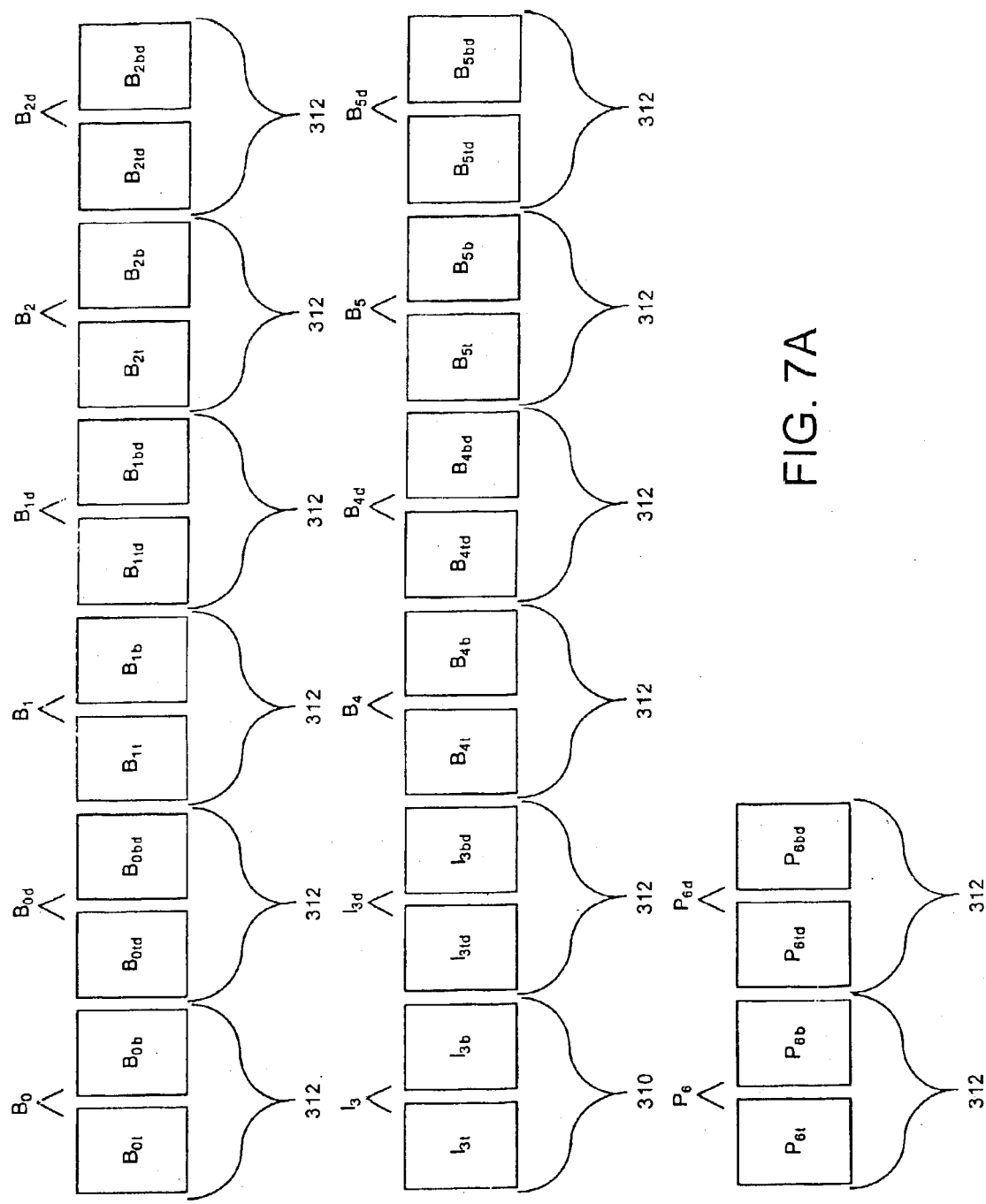
FIG. 7A illustrates a slow forward trick mode GOP in accordance with the inventive arrangements.

For example, FIG. 7A illustrates the GOP 300 of FIG. 3 in which the non-progressive pictures are shown separated into their respective fields. The prediction scheme employed in this example is the same as that shown in FIG. 3 and warrants no further description here. In this instance, each of the non-prediction source pictures 312 and the prediction source picture 310 can have a top field and a bottom field. The subscript letter "t" designates the particular field to which it is associated as a top field; similarly, the subscript letter "b" designates the particular field to which it is associated as a bottom field.

Here, a duplicate of each of the pictures in the GOP 300 has been added, and the altered GOP 300 represents a slow trick mode GOP. The subscript letter "d" represents that a particular field is a duplicate field. As an example, picture $B_0$ can include a top field $B_{0t}$ and a bottom field $B_{0b}$, while the duplicate of picture $B_0$, picture $B_{0d}$, can have a top field $B_{0td}$ and a bottom field $B_{0bd}$.

As shown, the top and bottom fields are displayed in an alternate fashion. If a moving object appears in these fields, that object will appear to vibrate because of the manner in which the fields are displayed. For example, if a moving object appears in one location in field $B_{0t}$ and in another location in field $B_{0b}$, the object will appear to jump back to the previous location (as displayed in picture $B_{0t}$) when the duplicate field $B_{0td}$ is displayed. When the next field is shown, duplicate field $B_{0bd}$, the object will again appear to jump to the location first displayed in picture $B_{0b}$. As such, the moving object appears to vibrate when duplicate pictures are added to the GOP 300. This vibration effect will continue so long as duplicate pictures are inserted into one or more GOPs 300 during the slow trick mode.

Referring back to method 600 of FIG. 6, another encoding step can be executed to overcome the vibration artifact, which may appear when certain trick modes are initiated in a remote decoder system. At step 615, the non-prediction source pictures and the prediction source pictures can be encoded into field pictures. As will be explained below, by encoding these pictures into field pictures, the display of the field pictures can be performed in accordance with a manner that helps control the vibration problem.

Figure 7B:
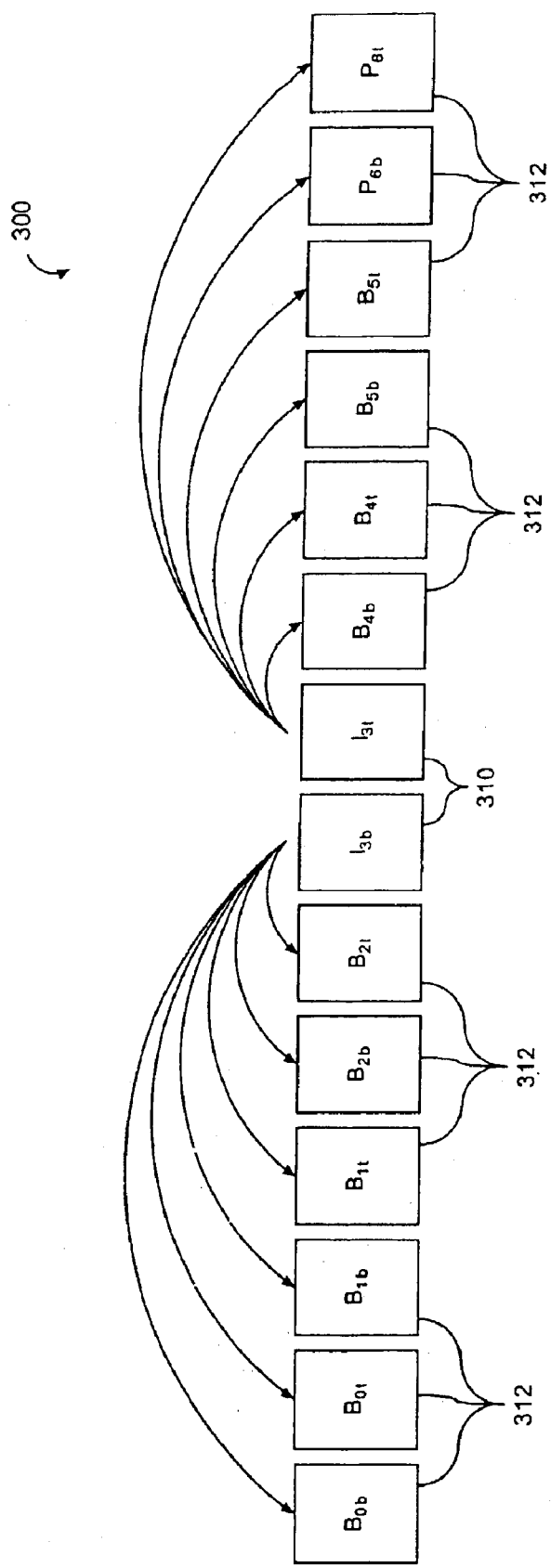
FIG. 7B illustrates a GOP containing field pictures in accordance with the inventive arrangements.

An example of this encoding step is shown in FIG. 7B. In this example, the GOP 300 of FIG. 3 is shown with the original non-progressive pictures encoded into field pictures. For example, picture $B_0$, which originally contained fields $B_{0t}$ and $B_{0b}$, has been encoded into field pictures $B_{0t}$ and $B_{0b}$. The field pictures that originally comprised non-prediction source pictures 312 can also be considered non-prediction source pictures 312. Similarly, the field pictures that originally comprised the prediction source picture 310 can be considered prediction source pictures 310. As such, for purposes of the invention, when referring to the terms "prediction source pictures" or "non-prediction source pictures," it is understood that such terms may refer to field pictures, even though the word "field" is not used expressly as a modifier for the terms.

In this particular example, either one of the prediction source pictures 310, i.e., the field pictures $I_{3t}$ and $I_{3b}$, can be used to predict any of the non-prediction source pictures. One suitable example is shown in which the field picture $I_{3t}$ (a prediction source picture 310) predicts all the non-prediction source pictures 312 in front (in display order) of picture $I_{3t}$. In addition, the field picture $I_{3b}$ (also a prediction source picture 310) can predict all the non-prediction source pictures 312 behind (in display order) the picture $I_{3b}$. Of course, the invention is not limited to this particular example, as other suitable prediction schemes can be employed.

Figure 7C:
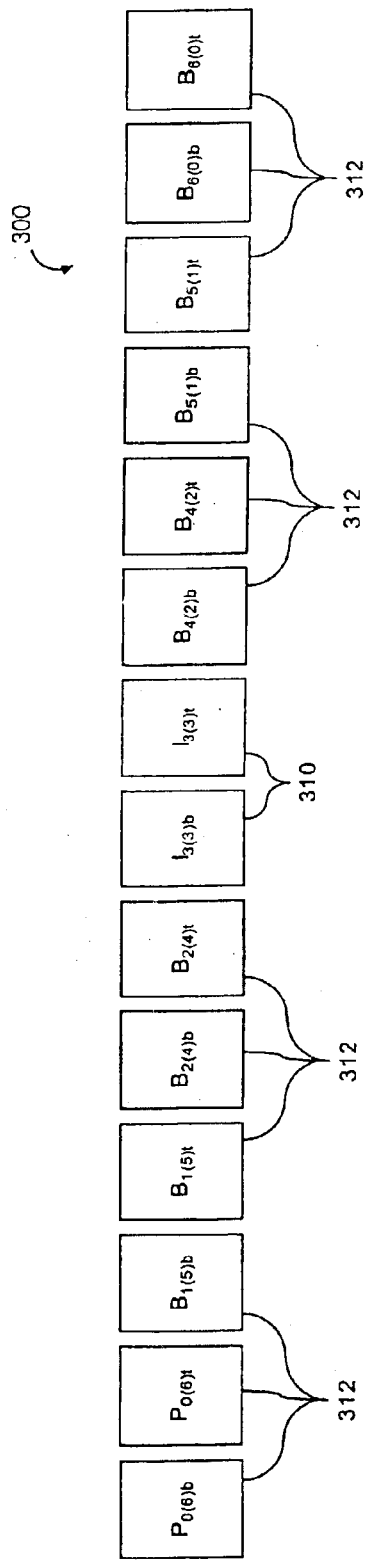
FIG. 7C illustrates the GOP of FIG. 7B in reverse display order in accordance with the inventive arrangements.

Referring back to method 600 of FIG. 6, at step 616, the non-progressive video signal containing the GOPs can be recorded onto a suitable storage medium. As shown at step 617, the non-progressive video signal containing the GOPs can be played back, and at step 618, a reverse trick mode command can be received. Similar to step 220 of FIG. 2, the display order of the GOPs can be altered to permit the GOPs to be displayed in a reverse order, as shown at step 620 in FIG. 6. Additionally, at step 622, the display indicators of the field pictures in these GOPs can be modified to reflect an intended display order. An example of the GOP 300 of FIG. 7B following these steps is shown in FIG. 7C. The original designations are shown in parentheses. In addition, because the field pictures are to be shown in reverse, each bottom field picture can be displayed before its corresponding top field picture.

Figure 7D:
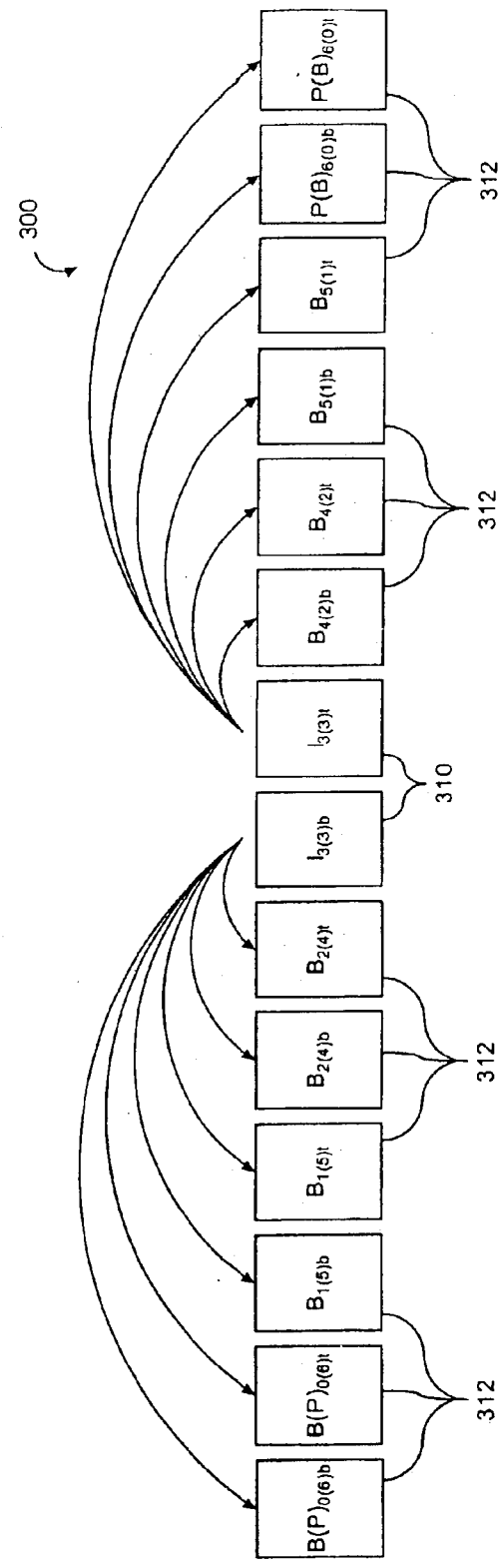
FIG. 7D illustrates the GOP of FIG. 7C with several of the pictures in the GOP having been converted to other types of pictures in accordance with the inventive arrangements.

Decision blocks 624, 628 and steps 626 and 630 of FIG. 6 are respectively similar to decision blocks 224, 228 and steps 226 and 230 of FIG. 2. That is, referring to method 600, the last pair of non-prediction source field pictures in the altered GOP can be converted to P field pictures, and the P field pictures in front of, in display order, the prediction source picture can be converted to B field pictures. Referring to FIG. 7D, an example of the GOP 300 of FIG. 7C following the above steps is shown. The original designations are shown in parentheses. The process for converting B pictures to P pictures and vice-versa has already been explained and warrants no further description here. An example of a suitable prediction scheme is also shown in FIG. 7D.

Referring back to FIG. 6, at decision block 632 (from jump circle A), it can be determined whether the number of non-prediction source (field) pictures in the GOP is to be modified for purposes of producing a playback speed less than or greater than normal playback speed. If not, the method 600 can stop at step 644. If yes, such a process can be executed at step 634.

Figure 7E:
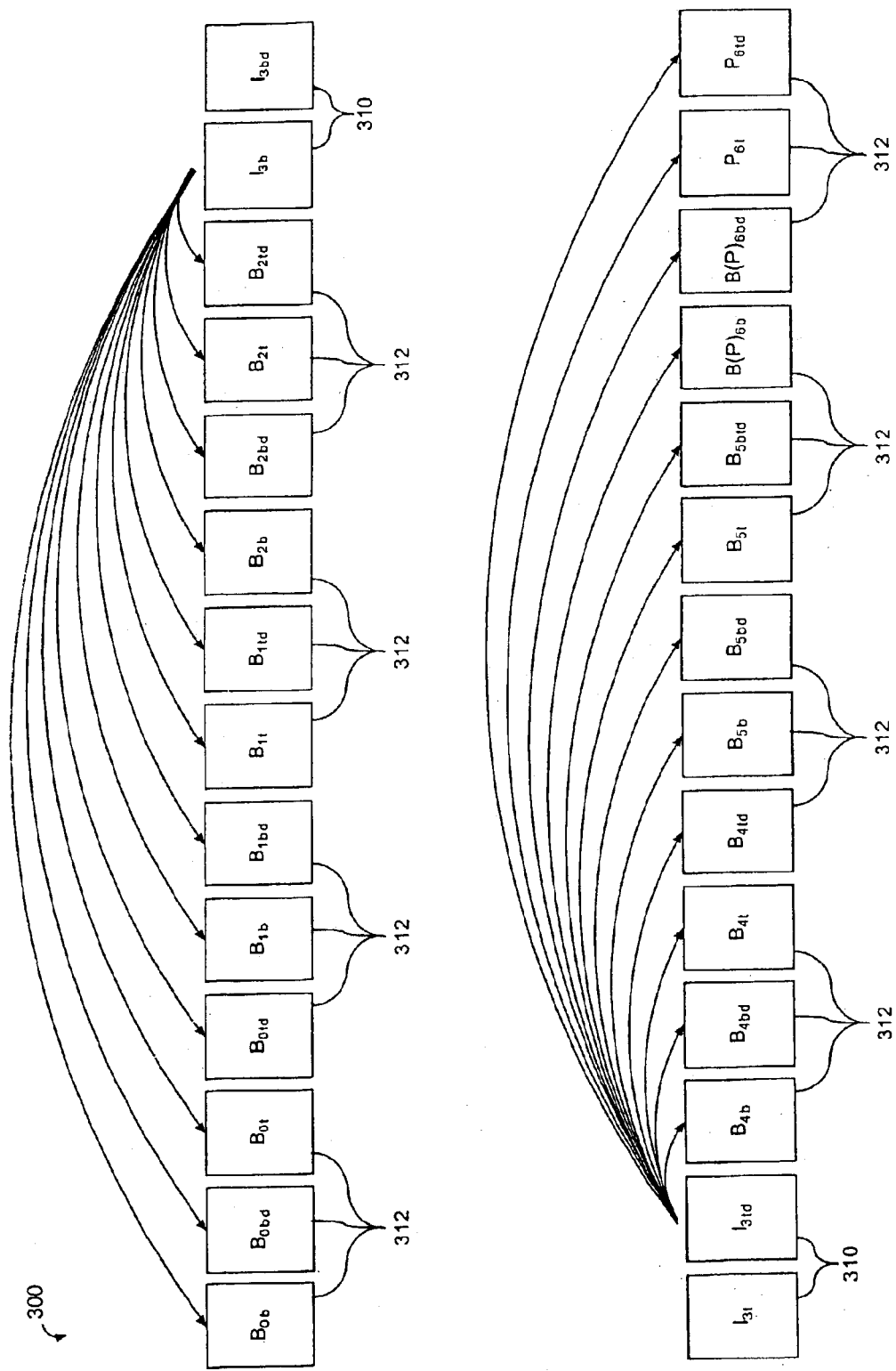
FIG. 7E illustrates an example of inserting duplicate pictures in the GOP of FIG. 7D in accordance with the inventive arrangements.

As an example, referring to FIG. 7E, the GOP 300 of FIG. 7D is shown with duplicate field pictures inserted into the GOP 300 (the original designations in parentheses are no longer shown). Although this particular example focuses on a slow reverse trick mode, it is understood that the modification step can include the skipping of pictures as well. This particular GOP 300 is illustrated as a slow reverse trick mode GOP with a playback speed of ½×. That is, a duplicate of each field picture has been inserted into the GOP 300; the duplicates of the field pictures can also be field pictures themselves. As reflected in FIG. 7E, the field pictures are shown such that a bottom field picture and its duplicate are successively displayed before the subsequent top field picture and its duplicate.

For example, field picture $B_{0b}$ and its duplicate, field picture $B_{0bd}$, are successively displayed and are followed by the display of field picture $B_{0t}$ and its duplicate, field picture $B_{0td}$. Thus, if a moving object appears in field pictures $B_{0b}$ and $B_{0t}$, the insertion of duplicate field pictures will not lead to a vibration artifact because the bottom field duplicate picture, $B_{0bt}$, will be displayed before the original top field picture, $B_{0t}$, and its duplicate, $B_{0td}$. This manner of display in which groups of field pictures are displayed before other groups of pictures having a different parity is made possible when the prediction source picture 310 and the non-prediction source pictures 312 are encoded into field pictures.

Specifically, by encoding the non-progressive pictures into field pictures, the field pictures can be transmitted to a remotely located decoder in an order that permits them to be displayed in a successive fashion similar to that depicted above. For example, for a ½× slow reverse trick mode, a bottom field picture and its duplicate can be transmitted to a remote decoder for decoding and display, and subsequently, the corresponding top field picture and its duplicate can be transmitted to the remote decoder.

To accommodate the display requirement that field pictures of different parities must follow one another, the parity of these field pictures, as located in the picture header, can be modified. For example, if a bottom field picture is located in a position where a top field picture is normally displayed, the parity of that bottom field picture can be modified such that the bottom field picture is actually defined as a top field picture. Changing the parity of a picture, however, does not affect the picture content.

As a more specific example, the parity of duplicate picture $B_{0bd}$, a bottom field picture in a location where a top field picture would normally be, can be modified such that this picture is actually defined as a top field picture. Moreover, the parity of field picture $B_{0t}$, a top field picture in a location where a bottom field picture is typically displayed, can be modified to define picture $B_{0t}$ as a bottom field picture. This concept can apply to the remaining field pictures in the GOP 300. The process of modifying the parities of these pictures, however, does not affect the elimination of the vibration artifact.

A suitable prediction technique for the trick mode GOP in FIG. 7E is also illustrated. The field picture $I_{3b}$ can be used to predict any of the non-prediction source pictures 312 (including the duplicate field pictures) positioned in front (in display order) of picture $I_{3b}$. As those of ordinary skill in the art will appreciate, using picture $I_{3b}$ to predict these particular pictures is useful because picture $I_{3b}$ was used to predict the original non-prediction source pictures 312 in front of picture $I_{3b}$. In addition, the field picture $I_{3td}$ can be used to predict any of the non-prediction source pictures 312 behind (in display order) picture $I_{3td}$. Picture $I_{3td}$ is useful for predicting these pictures because, in accordance with the above discussion concerning the changing of the parity of certain pictures, picture $I_{3td}$ is defined as a bottom field picture in this example; a bottom field picture was the type of picture used to predict the original non-source prediction pictures 312 behind picture $I_{3td}$.

To further improve the prediction scheme of this example, pictures $P_{6b}$ and $P_{6bd}$ can be converted to B pictures $B_{6b}$ and $B_{6bd}$, with the former designations shown in parentheses. As will be apparent to those of skill in the art, converting these P field pictures to B field pictures can prevent the prediction of the last two field pictures, $P_{6t}$ and $P_{6td}$, from being negatively affected. This conversion has been previously illustrated.

As an option, one or more of the duplicate pictures inserted in the GOP 300 can be dummy B or dummy P field pictures, which can help lower the bit rate of the video signal containing the GOP 300 during a trick mode, including both slow and fast forward trick modes. Adding dummy B or P field pictures may be particularly useful in a remote decoder system.

The remaining steps illustrated in method 600 of FIG. 6 are similar to the steps presented in method 200 of FIG. 2. As such, the steps of method 600 do not require an in depth discussion. At decision block 636, if the last pair of non-prediction source field pictures in the GOP has been skipped, the method 600 can continue at decision block 638. If not, the method 600 can resume at decision block 642.

At decision block 638, it can be determined whether the immediate pair of prior non-prediction source field pictures are P field pictures. If they are, the method 600 can continue at step 642. If they are not, the immediate pair of prior non-prediction source field pictures can be converted to a pair of P field pictures, as shown at step 640, a process described earlier. At step 642, the display indicators of the field pictures can be modified. Finally, the method can end at step 644.

Although the present invention has been described in conjunction with the embodiments disclosed herein, it should be understood that the foregoing description is intended to illustrate and not limit the scope of the invention as defined by the claims.

What is claimed is:

1. A method of performing a reverse trick mode, comprising the steps of:

receiving a non-progressive video signal;

encoding the non-progressive video signal into at least one group of pictures having at least one prediction source picture and at least one non-prediction source picture, wherein all the non-prediction source pictures are predicted from the at least one prediction source picture such that no non-prediction source picture is predicted from another non-prediction source picture; and in response to a reverse trick mode command, altering the display order of the group of pictures to permit the group of pictures to be displayed in a reverse order.

2. The method according to claim 1, further comprising the steps of:

recording the non-progressive video signal to a storage medium; and playing back the non-progressive video signal.

3. The method according to claim 1, further comprising the step of modifying at least the number of non-prediction source pictures in the group of pictures in response to the reverse trick mode command.

4. The method ac cording to claim 1, wherein the prediction source picture is an intra picture.

5. The method according to claim 1, wherein at least a portion of the non-prediction source pictures are bidirectional predictive pictures.

6. The method according to claim 1, wherein at least a portion of the non-prediction source pictures are predictive pictures.

7. The method according to claim 5, wherein each of the bidirectional predictive pictures are one-directional bidirectional predictive pictures.

8. The method according to claim 3, wherein said modifying step comprises the step of skipping at least one non-prediction source picture in the group of pictures.

9. The method according to claim 3, wherein said modifying step comprises the step of inserting in the group of pictures a duplicate of at least one non-prediction source picture.

10. The method according to claim 8, wherein the at least one skipped non-prediction source picture is a predictive picture being the last picture in display order in the group of pictures and wherein said method further comprises the step of converting an immediate prior non-prediction source picture in display order in the group of pictures into a predictive picture unless the immediate prior non-prediction source picture is a predictive picture.

11. The method according to claim 1, wherein each of the prediction source picture and the non-prediction source pictures contains a display indicator and the method further comprises the step of modifying the display indicator of at least a portion of the prediction source pictures and non-prediction source pictures to reflect an intended display order.

12. The method according to claim 11, wherein the display indicator is a temporal reference field.

13. The method according to claim 3, wherein each of the prediction source picture and the non-prediction source picture contains a display indicator and the method further comprises the step of modifying the display indicator of at least a portion of the prediction source pictures and the non-prediction source pictures to reflect an intended display order.

14. The method according to claim 13, wherein the display indicator is a temporal reference field.

15. The method according to claim 1, following said altering step, further comprising the step of converting the last non-prediction source picture in the altered group of pictures to a predictive picture unless the last non-prediction source picture in the altered group of pictures is a predictive picture.

16. The method according to claim 1, following said altering step, further comprising the step of selectively converting to bidirectional predictive pictures the non-prediction source pictures in front of, in display order, the prediction source picture.

17. The method according to claim 1, further comprising the step of performing said receiving, said encoding and said altering steps in a remote decoder system.

18. The method according to claim 17, further comprising the step of encoding at least a portion of the prediction source and non-prediction source pictures into field pictures.

19. A system for performing a reverse trick mode, comprising:

a processor for encoding a non-progressive video signal into at least one group of pictures having at least one prediction source picture and at least one non-prediction source picture, wherein all the non-prediction source pictures are predicted from the at least one prediction source picture such that no non-prediction source picture is predicted from another non-prediction source picture; and a decoder for decoding the group of pictures;

wherein the processor is further programmed to, in response to a reverse trick mode command, alter the display order of the group of pictures to permit the group of pictures to be displayed in a reverse order.

20. The system according to claim 19, further comprising a controller for recording the non-progressive video signal to a storage medium and playing back the non-progressive video signal.

21. The system according to claim 19, wherein the processor is further programmed to modify at least the number of non-prediction source pictures in the group of pictures in response to the reverse trick mode command.

22. The system according to claim 19, wherein the prediction source picture is an intra picture.

23. The system according to claim 19, wherein at least a portion of the non-prediction source pictures are bidirectional predictive pictures.

24. The system according to claim 19, wherein at least a portion of the non-prediction source pictures are predictive pictures.

25. The system according to claim 23, wherein each of the bidirectional predictive pictures are one-directional bidirectional predictive pictures.

26. The system according to claim 21, wherein the processor is further programmed to skip at least one non-prediction source picture in the group of pictures.

27. The system according to claim 21, wherein the processor is further programmed to insert in the group of pictures a duplicate of at least one non-prediction source picture.

28. The system according to claim 26, wherein the at least one skipped non-prediction source picture is a predictive picture being the last picture in display order in the group of pictures and wherein the processor is further programmed to convert an immediate prior non-prediction source picture in display order in the group of pictures into a predictive picture unless the immediate prior non-prediction source picture is a predictive picture.

29. The system according to claim 19, wherein each of the prediction source picture and the non-prediction source pictures contains a display indicator and the processor is further programmed to modify the display indicator of at least a portion of the prediction source pictures and non-prediction source pictures to reflect an intended display order.

30. The system according to claim 29, wherein the display indicator is a temporal reference field.

31. The method according to claim 21, wherein each of the prediction source picture and the non-prediction source picture contains a display indicator and the processor is further programmed to modify the display indicator of at least a portion of the prediction source pictures and the non-prediction source pictures to reflect an intended display order.

32. The method according to claim 31, wherein the display indicator is a temporal reference field.

33. The system according to claim 19, wherein the processor is further programmed to convert the last non-prediction source picture in the altered group of pictures to a predictive picture unless the last non-prediction source picture in the altered group of pictures is a predictive picture.

34. The system according to claim 19, wherein the processor is further programmed to selectively convert to bidirectional predictive pictures the non-prediction source pictures in front of, in display order, the prediction source picture.

35. The system according to claim 19, wherein the processor and the decoder are part of a remote decoder system.

36. The system according to claim 35, wherein the processor is further programmed to encode at least a portion of the prediction source and non-prediction source pictures into field pictures.

* * * * *